United States Patent
Linnartz

(10) Patent No.: US 7,573,961 B2
(45) Date of Patent: Aug. 11, 2009

(54) VIRTUAL-ANTENNA RECEIVER

(75) Inventor: Johan Paul Marie Gerard Linnartz, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 572 days.

(21) Appl. No.: 10/569,180

(22) PCT Filed: Mar. 17, 2004

(86) PCT No.: PCT/IB2004/051473

§ 371 (c)(1),
(2), (4) Date: Feb. 22, 2006

(87) PCT Pub. No.: WO2005/022777

PCT Pub. Date: Mar. 10, 2005

(65) Prior Publication Data

US 2007/0004365 A1    Jan. 4, 2007

(30) Foreign Application Priority Data

Sep. 3, 2003  (EP) .................................. 03103282

(51) Int. Cl.
*H04B 7/10* (2006.01)
*G01S 13/08* (2006.01)
(52) U.S. Cl. ...................................... 375/347; 342/127
(58) Field of Classification Search ................. 375/347, 375/299, 346, 267, 316; 342/125, 118, 127, 342/145, 422, 373; 455/272, 132; 370/342, 370/335, 441
See application file for complete search history.

(56) References Cited

U.S. PATENT DOCUMENTS

| 5,592,471 | A  |   | 1/1997  | Briskman |         |
|-----------|----|---|---------|----------|---------|
| 5,844,632 | A  |   | 12/1998 | Kishigami et al. | |
| 6,963,301 | B2 | * | 11/2005 | Schantz et al. | 342/125 |
| 7,148,845 | B2 | * | 12/2006 | Rooyen et al. | 342/377 |

FOREIGN PATENT DOCUMENTS

| DE | 3839421 A1 | 5/1990 |
|----|------------|--------|
| DE | 4040599 A1 | 7/1992 |
| DE | 4040599 C2 | 7/1992 |
| DE | 4140741 A1 | 6/1993 |
| EP | 0718986 A2 | 6/1996 |
| EP | 0767554 A2 | 4/1997 |
| JP | 4-185130   | 7/1992 |
| JP | 04185130 A | 7/1992 |

OTHER PUBLICATIONS

Minoru Okada, et al: Array Antenna Assisted Adaptive Modulation in a Fast Fading Channel, IEEE VTC, May 2001, vol. 2 of 4. Conf. 53, pp. 1249-1253, XP001067162.
Written Opinion of the International Searching Authority PCT/IB2004/051473.

* cited by examiner

*Primary Examiner*—Khai Tran

(57) ABSTRACT

A receiver for reception of radio signals while the receiver is moving at a high speed using two or more antennas closely spaced and arranged behind each other in the direction of motion for receiving the radio signals. A signal is obtained which represents a virtual antenna that is at least temporarily stationary with respect to the environment, despite the movement of the receiver. The receiving signal of the virtual antenna is obtained under the control of a feedback signal of the receiver.

24 Claims, 4 Drawing Sheets

VIRTUAL-ANTENNA RECEIVER

The present invention relates to a receiver comprising a first receiving branch having associated thereto a first antenna and at least a second receiving branch having associated thereto a second antenna, the receiver comprising first means for obtaining from a first signal on the first receiving branch and a second signal on the second receiving branch a third signal representing a first virtual antenna being at least temporarily stationary with respect to the environment when the receiver is moving with a speed.

Furthermore, the present invention relates to a method for canceling or at least reducing signal distortions of a radio signal received by a moving receiver comprising a first receiving branch having associated thereto a first antenna and at least a second receiving branch having associated thereto a second antenna, wherein the first antenna and the second antenna are spaced by a distance and arranged behind each other in the direction of motion of the receiver, said method comprising the following steps: obtaining a first signal on the first receiving branch and a second signal on the second receiving branch; and obtaining from the first signal and the second signal a third signal representing a first virtual antenna being at least temporarily stationary with respect to the environment when the receiver is moving with a speed.

Finally, the present invention relates to a computer program stored on a record carrier or made available for download, said computer program being adapted to carry out the method in accordance with the present invention.

In mobile reception, radio signals experience channel conditions that vary (often rapidly) with time. This is mainly caused by multipath radio signal propagation, wherein reflected waves may cancel each other at one location, but may enhance each other elsewhere. A well known model to describe this effect, which is referred to as "fading", is to assume that the received signal consists of multiple reflected waves, each arriving from a different angle at the moving receive antenna. This results in slightly different Doppler shifts for each wave. The collection of Doppler shifts is called Doppler spread of a signal.

In general, the fading effects for a moving receiver are seen as time variations of the radio channel.

Diversity is a known method to improve the reliability of reception of radio signals. In a diversity system at least two antennas are used to receive the radio signal. Signals from the at least two antennas are combined to improve the reliability of reception. If the channel is fading, an adaptation method is used to continuously ensure that the signals from the multiple antennas are combined in a constructive way.

JP-A-04-185130 discloses a diversity receiver of the above mentioned type. To reduce the effect of a multipath and to attain stable transmission reception, there is provided a second antenna parted spatially with respect to a first antenna. The distance between the two antennas is spatially parted by $\lambda/3$ (wherein $\lambda$ is a wavelength of a carrier) or over that, so that a reception signal from the one antenna and a reception signal from the other antenna are almost in non-correlation.

A further approach for improving the reliability of reception is to process the received signal in order to mitigate the effects of channel variations. In particular for Orthogonal Frequency Division Multiplexing (OFDM) modulation methods, it is known that rapid channel variations lead to a degradation of the reliability of the radio link. OFDM is a modulation method in which multiple user symbols are transmitted in parallel using different sub-carriers. The OFDM receiver structure allows relatively straightforward signal processing.

A practical implementation of the OFDM modulation method typically involves a (Fast) Fourier Transformation of the user bits, before and after radio transmission. As a result, the data are divided into many parallel streams. Each stream is modulated on a different sub-carrier frequency. In general, OFDM systems are designed such that each data symbol waveform is located around a particular sub-carrier frequency, and that its bandwidth is small enough to experience frequency-flat fading, when the signal is received over a (moderately) frequency-selective channel. The modulated sub-carriers comprise overlapping side lobes. In many existing systems the rectangular pulse shape leads to a spectrum according to a sinc function. These signal waveforms are carefully spaced in frequency and thereby designed to be orthogonal, i.e. not interfering with each other. A Doppler spread, for example caused by fading, is detrimental to this orthogonality of the OFDM sub-carrier signals since arriving waves will interfere with other waves having different frequency offsets. This is called inter-carrier interference (ICI).

Although with diversity receivers, for example of the type disclosed in JP-A-04-185130, and the approached mentioned above the reliability of reception may be improved, especially in the context of reception of high rate radio signals and receivers moving at a high speed there is still a problem in that channel conditions vary too rapidly with time.

To improve the receiving characteristics of a moving receiver, especially of a receiver moving at a high speed, it is already known to create a virtual stationary antenna, i.e. a virtual antenna that is moved between the first antenna and the second antenna with the same speed as the receiver, but in the opposite direction. With this solution the deteriorations of the receiving characteristics that are caused by the movement of the receiver may be compensated at least partly.

Such a solution is for example disclosed in the IEEE publication 0-7803-6728-6/01, pages 1249 to 1252 "Array Antenna Assisted Adaptive Modulation in a Fast Fading Channel". This publication discloses a receiver and a method of the type mentioned at the beginning in connection with a two-way system where the TDD transmit/receive cycle dictates the fixing moment and place of the virtually stationary position.

It is the object of the present invention to further develop the receivers and the methods of the type mentioned above such that they may also be used in connection with broadcast signals, i.e. in connection with one-way systems.

The above object is solved by the features of the independent claims. Further developments and preferred embodiments of the invention are outlined in the dependent claims.

In accordance with a first aspect of the present invention, the above object is solved by a receiver of the type mentioned at the beginning which is characterized in that the first means are controlled by a feedback signal of the receiver.

In accordance with a second aspect of the present invention, the above object is solved by a method of the type mentioned at the beginning which is characterized in that the third signal is obtained under control of a feedback signal of the receiver.

The above mentioned aspects of the present invention are based on the finding that a stationary or fixed effective receive position of the virtual antenna can in practice only be realized for limited period of time, since for example a vehicle comprising the receiver may move over prolonged distances that largely extend the physical dimensions of the antenna structure. In such case the virtual antenna position must be changed at discrete moments, to follow the long-term motion of the vehicle. Preferably this switching of the antenna position coincides with the end of individual data blocks, for example OFDM blocks, but does not occur during the reception of one such block. In this connection the moment of switching to a new virtually fixed position of the virtual antenna is preferably controlled by a feedback signal coming from the synchronization mechanism of the receiver, for example a OFDM block or frame synchronization mechanism of the receiver.

Although most of the following features are only claimed in connection with the receiver, it is to be noted that the person skilled in the art may suitably adapt these features without problem such that they may also be used advantageously in connection with the method and in accordance with the present invention.

The first antenna and the second antenna are preferably spaced by a distance and arranged behind each other in the (main) direction of motion of the receiver only. In this case the second antenna follows at least substantially the same spatial path as the first one, but with a slight time lag. The direction of motion particularly may be the direction of motion of a vehicle comprising the receiver.

With preferred embodiments the first means comprise adaptive combiner means for linearly interpolating between the first signal and the second signal to obtain the third signal.

It is preferred that the first means are additionally controlled by a parameter related to the speed of the receiver. To keep the virtual antenna in place with respect to the environment, it is additionally necessary to control the interpolation between the first signal and the second signal on the basis of the speed of the receiver. For example, if the receiver in accordance with the invention is mounted to a car, the necessary speed information may be obtained via the speedometer.

Furthermore, embodiments are possible wherein the receiver comprises second means for obtaining a fourth signal representing a second virtual antenna being at least temporarily stationary with respect to the environment when the receiver is moving with the speed. With this solution the advantages of know stationary diversity receivers having multiple antennas may for example be achieved.

In this context it is preferred that the second means obtain the fourth signal also from the first signal on the first receiving branch and the second signal on the second receiving branch to keep the complexity of the circuitry as low as possible. However, the invention is not limited to such solutions and it is for example also possible to use more than one set of antennas to create the virtual antennas.

Further advantages may be achieved, if the first means and the second means are controlled such that one of the first virtual antenna and the second virtual antenna is stationary with respect to the environment, at least when the other is not. For example it is possible to rearrange the first virtual antenna close to the first antenna before the second virtual antenna, which to be stationary with respect to the environment is moved towards the second antenna with respect to a system of coordinates moving with the receiver, reaches the second antenna.

One or more of the first means and the second means may for example fully or in part be realized by hardware interacting with software or by discrete components.

Without being limited thereto, it is preferred that the receiver in accordance with the present invention is adapted to be used in one or more of the following systems: Orthogonal Frequency Division Multiplexing (OFDM) systems, Digital Audio Broadcasting (DAB) systems, Digital Video Broadband (DVB) systems, for example DVB-T systems, Digital Terrestrial Television Broadcasting (DTTB) systems, Code Division Multiple Access (CDMA) systems, for example cellular CDMA systems, Universal Mobile Telecommunications Systems (UMTS), the Global System for Mobile communications (GSM), Digital Enhanced Cordless Telecommunication (DECT) systems, wireless local area network systems, for example according to the standard 802.11a, 802.11g, or HIPERLAN II.

With preferred embodiments the receiver performs a Fast Fourier Transformation and/or an Inverse Fast Fourier Transformation, wherein the feedback signal of the receiver is at least partially obtained before the Fast Fourier Transformation and/or the Inverse Fast Fourier Transformation is performed.

Additionally or alternatively it is possible that the receiver performs a Fast Fourier Transformation and/or an Inverse Fast Fourier Transformation, wherein the feedback signal of the receiver is at least partially obtained after the Fast Fourier Transformation and/or the Inverse Fast Fourier Transformation is performed.

In cases where the feedback signal is partially obtained before and after the Fast Fourier Transformation and/or the Inverse Fast Fourier Transformation is performed, the part obtained before the transformation may be responsible for a coarse timing synchronization while the part obtained after the transformation may be responsible for a fine timing synchronization. In such a case a timing signal combiner is preferably provided for suitably combining fine and the coarse timing signals.

It is a gist of the present invention to recognize that a diversity antenna system comprising at least two distinguishable active elements and a signal processing algorithm may be used together to create a virtually-stationary antenna, i.e. an antenna that effectively has a temporarily fixed position despite of the motion of the receiver, to cancel or at least reduce signal distortions caused by a (fast) movement of the receiver.

Figure 1:
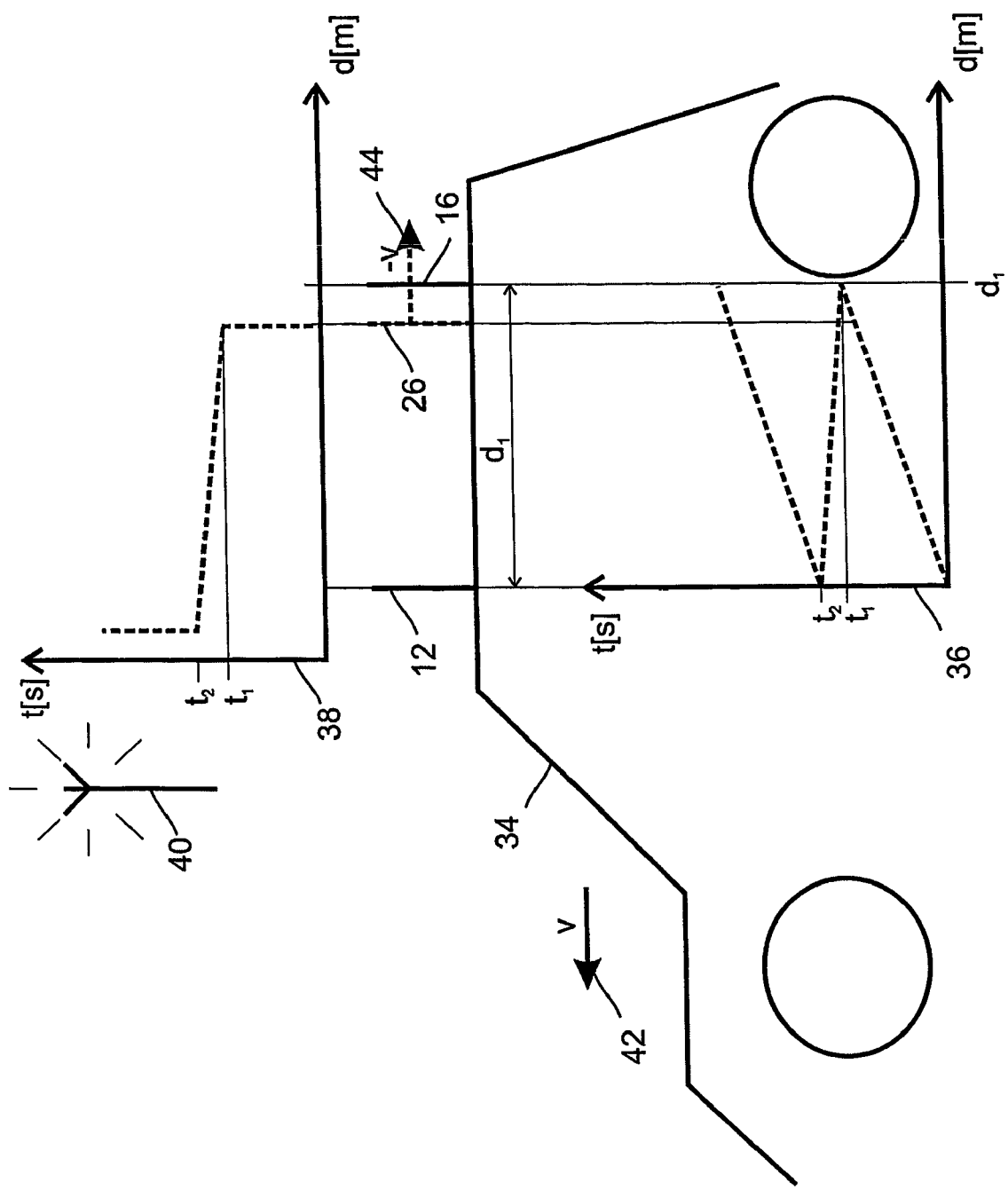
FIG. 1 illustrates the creation of a virtual antenna in accordance with a preferred embodiment of the present invention.

FIG. 1 illustrates the creation of a virtual antenna in accordance with a preferred embodiment of the present invention. FIG. 1 schematically shows a car 34 moving with a speed v in the direction of the arrow 42. The car 34 comprises a receiver in accordance with the invention of which only a first antenna 12 and a second antenna 16 are shown. The first antenna 12 and the second antenna 16 are arranged with a distance $d_1$ which is shown exaggerated large. In practice this distance $d_1$ may for example be smaller than $\lambda/2$ (or even smaller than $\lambda/3$), wherein $\lambda$ is the wavelength of a signal transmitted by a transmitter 40 and to be received by the receiver in accordance with the invention. However, the present invention, for example to enhance positive diversity effects, is not limited to embodiments having a smaller distance than $\lambda/2$ between the first antenna 12 and the second antenna 16, although smaller distances are preferred.

Furthermore, in FIG. 1 there is shown a first system of coordinates 36, which is stationary with respect to the car 34, and a second system of coordinates 38 which is stationary with respect to the environment. Both systems of coordinates 36, 38 show, depending on the time d the position d of a first virtual antenna 26 which is created by the receiver in accordance with the invention (in a way described in detail with reference to FIG. 2). The first virtual antenna 26 is controlled to move between the first antenna 12 and the second antenna 16 with a speed −v, i.e. with the magnitude v but in the opposite direction as the car moves (see arrow 44). Thereby, as may be seen from the second systems of coordinates 38, the virtual antenna is stationary with respect to the environment for a time interval $[0, t_1]$. However, within the time interval $[0, t_1]$ the virtual antenna 26 moves with respect to the car 34 as may be seen from the first system of coordinates 36. The fixed effective receive position can in practice only be realized for a limited period of time, since the vehicle may move over prolonged distances that largely extend the physical dimensions of the antenna structure. Thus, the first virtual antenna 26 will "collide" with the second antenna 16. In such case at the latest the position of the first virtual antenna must be changed to follow the long-term motion of the vehicle. As indicated in the first and second systems of coordinates 36, 38, the first virtual antenna 26 in a time interval $[t_1, t_2]$ is repositioned close to or coinciding with the first antenna 12. For example in connection with the reception of OFDM signals, repositioning or switching of the position of the first virtual antenna 26 coincides the end of individual OFDM blocks, but does not occur during the reception of one such block. In accordance with the invention, the moment of switching to a new virtually-fixed position is controlled by a feedback signal SYNC coming from the (OFDM block or frame) synchronization mechanism of the receiver.

Figure 2:
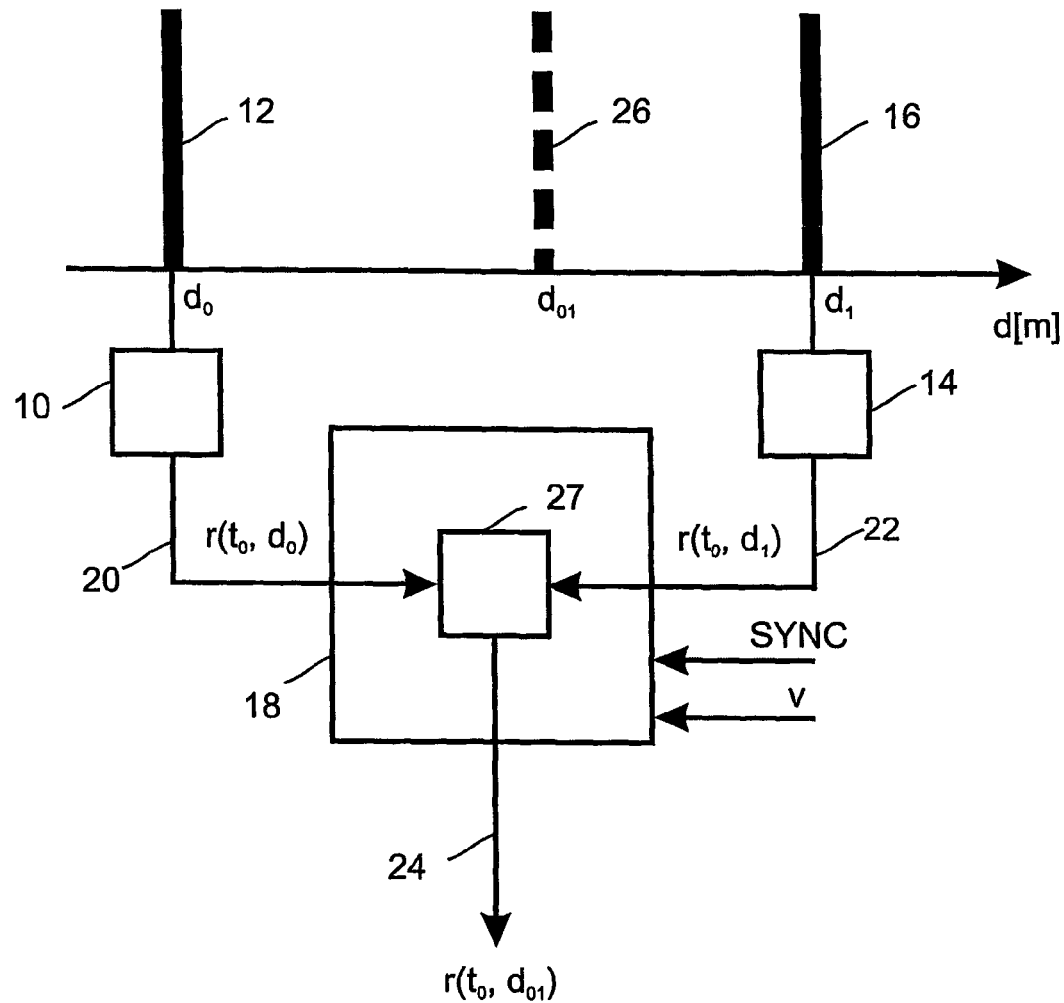
FIG. 2 shows a simplified schematic block diagram of a first embodiment of a receiver in accordance with the present invention, and it further illustrates the method in accordance with the invention.

FIG. 2 shows a simplified schematic block diagram of a first embodiment of a receiver in accordance with the present invention, and it further illustrates the method in accordance with the invention. In FIG. 2 there is shown a first receiving branch 10 having associated thereto the first antenna 12 and a second receiving branch 14 having associated thereto the second antenna 16. A first signal 20 on the first receiving branch 10 is a signal $r(t_0, d_0)$, i.e. a signal that is received at the moment $t_0$ at the position $d_0$. Similar, a second signal 22 on the second receiving branch 14 is a signal $r(t_0, d_1)$, i.e. a signal that is also received at the moment $t_0$ but at the position $d_1$. The first and second signals 20, 22 are fed to first means 18 which calculate a third signal 24 representing the first virtual antenna 26, i.e. a signal $r(t_0, d_{01})$ that would have been received at the moment $t_0$ by an antenna located at the position $d_{01}$. With the embodiment shown in FIG. 2, to obtain the third signal 24, the first means comprise adaptive combiner means 27 which linearly interpolate between the first signal 20 and the second signal 22 to create the virtual antenna 26. To keep the virtual antenna 26 stationary with respect to the environment, the virtual antenna 26 has to be virtually moved with the magnitude of the speed v. Therefore, the speed v is supplied as an input signal to the first means 18. Furthermore the synchronization signal SYNC from the receiver is supplied to the first means 18. As mentioned in connection with FIG. 1, this SYNC signal is used for the timing of the switching to a new virtual position of the first virtual antenna 26.

Figure 3:
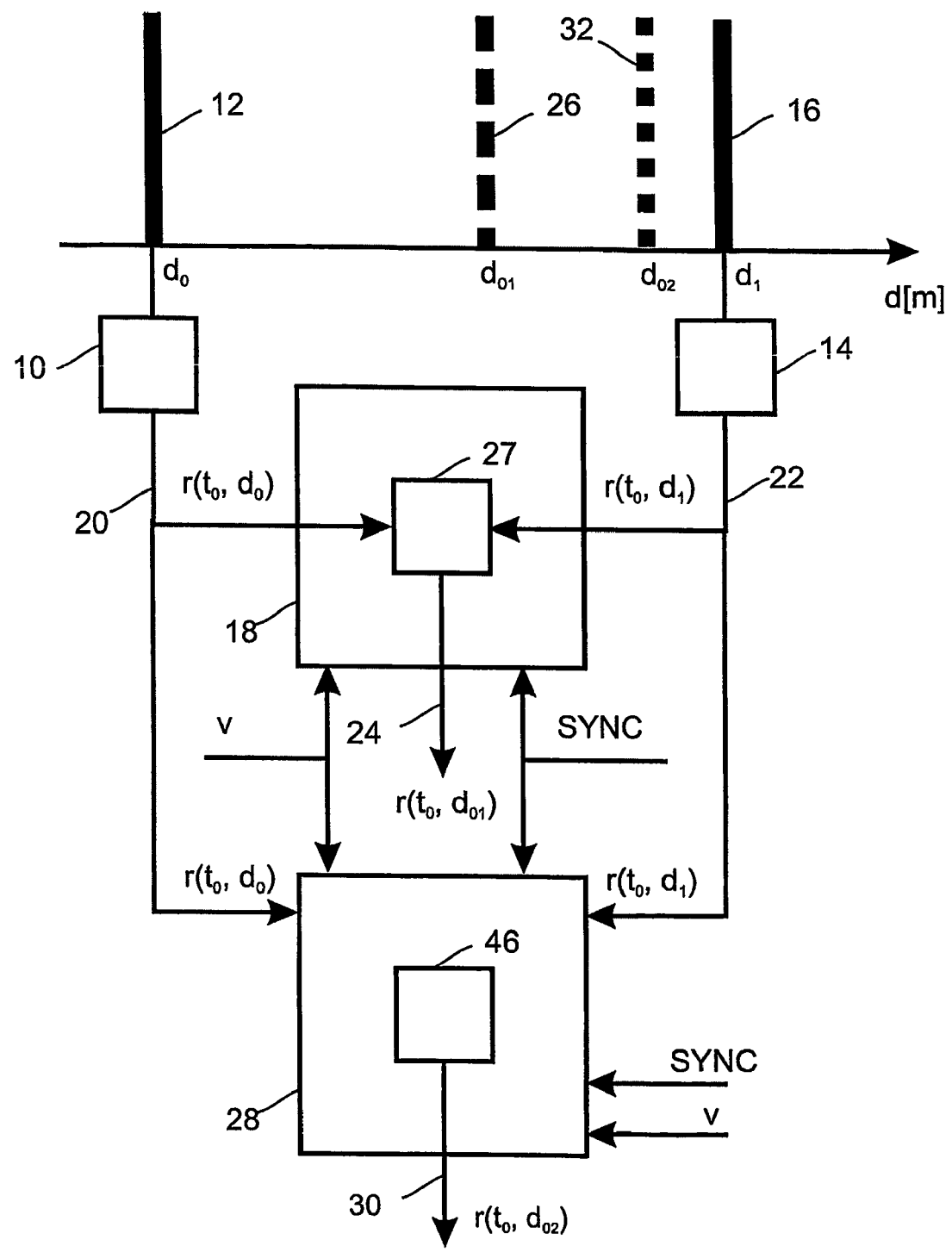
FIG. 3 shows a simplified schematic block diagram of a second embodiment of a receiver in accordance with the present invention.

FIG. 3 shows a simplified schematic block diagram of a second embodiment of a receiver in accordance with the present invention. This embodiment comprises all the equipment shown in FIG. 2 and additionally second means 28 for obtaining a fourth signal 30 representing a second virtual antenna 32. The fourth signal 30 corresponds to a signal $r(t_0, d_{02})$ that would have been received at the moment $t_0$ by an antenna located at the position $d_{02}$. To obtain the fourth signal 30, the second means 28 also comprise adaptive combiner means 46 which linearly interpolate between the first signal 20 and the second signal 22. Although the switching to new positions of the first virtual antenna 26 and the second virtual antenna 32 is performed depending on the synchronization signal SYNC, with the embodiment of FIG. 2 it is possible to have at least one virtual antenna stationary at every moment. This may facilitate the switching operations. Furthermore, for relative large time intervals it is possible to create two stationary virtual antennas at different positions. This for example may be used to achieve the advantages of known stationary diversity receivers. As regards the necessary synchronization, with alternative solutions it is possible to obtain this synchronization without the feedback SYNC from the main receiver. For example the synchronization may be obtained from a first free running oscillator, giving a pulse at instants $N \cdot T$, with $N = 0, 1, \ldots$, and a second oscillator giving a pulse at instants $N_a \cdot T$, with $N_a = 0.5, 1.5, 2.5, \ldots$, wherein T for example may be the sampling rate and N and $N_a$, respectively, may be the number of bits for which a serial to parallel conversion is performed. Thus, the third signal 24 and the fourth signal 30 will experience synchronization discontinuities, and consequently bursts of errors at the instants $N \cdot T$ and $N_a T$, respectively. Since $N \cdot T$ and $N_a \cdot T$ in this case occur at different instances, the burst errors, both signals can be advantageously combined.

Figure 4:
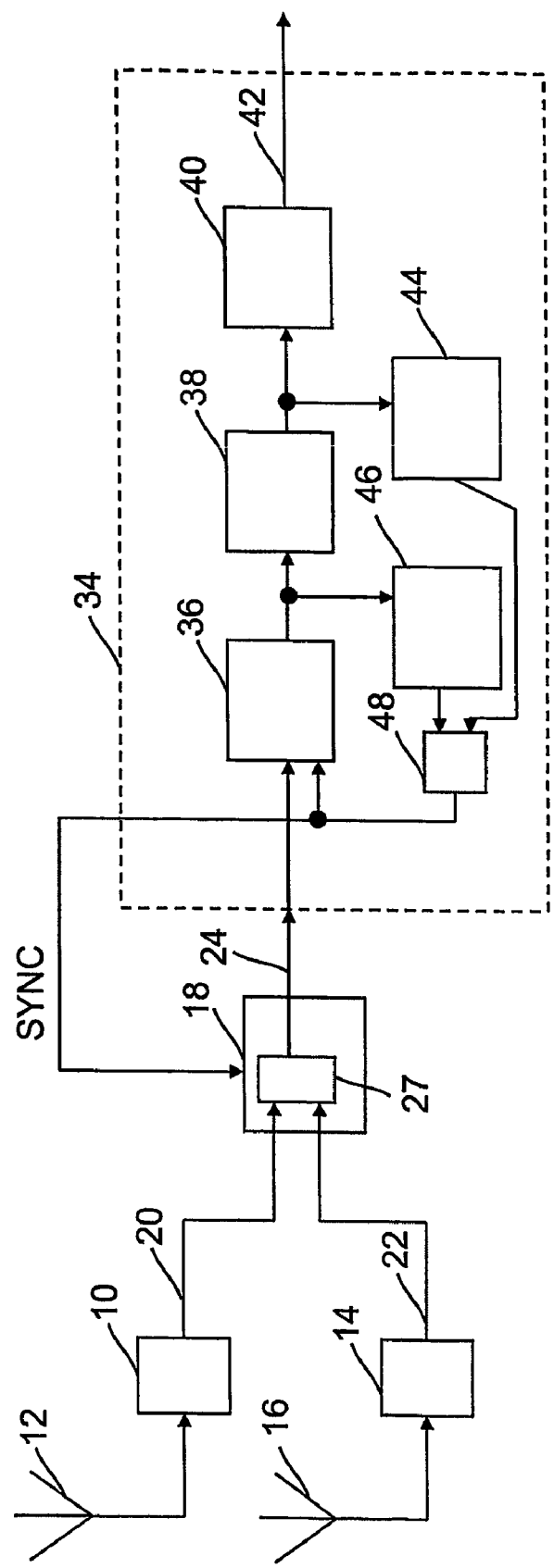
FIG. 4 shows a simplified schematic block diagram illustrating a preferred possibility to obtain the feedback signal of the receiver.

FIG. 4 shows a simplified schematic block diagram illustrating a preferred possibility to obtain the feedback signal of the receiver. As regards the components or blocks 12 to 24, reference is made to the description of FIG. 2 since the respective components or parts correspond to each other. In FIG. 4 the components of an OFDM receiver in accordance with the prior art are summarized as a block 34. This block 34 contains serial to parallel converter means 36 that are also used to select the window for a Fast Fourier Transformation that is carried out in Block 38. After the Fast Fourier Transformation (FFT) a data detection, possibly with a channel equalization and an error correction is performed in block 40 which outputs an output signal 42. In block 46 there is performed a pre-FFT timing recovery to provide a coarse timing synchronization. Additionally, in block 44 there is performed a post-FFT timing recovery to provide a fine timing synchronization. The coarse and the fine timing synchronizations are combined by a combiner 48 which creates the synchronization signal SYNC which in accordance with the invention is used to control the first means 18.

As already mentioned above, the invention also encompasses embodiments where only one of the pre-FFT and the post-FFT timing recovery is used. In such a case the combiner 48 can be omitted.

With the invention described above, for a moving receiver it is possible to efficiently cancel or at least reduce signal distortions in connection with the receipt of broadcast signals by creating at least one virtual antenna which is at least temporarily stationary with respect to the environment. Thereby it is for example possible to receive high rate radio signals (for example video signals having for example a rate of 5 Mbits/sec) with a receiver moving at a high speed (for example a receiver located in a car).

All means mentioned in the description and the claims may be realized, depending on the special embodiment, by components known in the art. In this connection discrete components and/or hardware interacting with software may form one or more of the mentioned means in part or as a whole. Furthermore, any reference signs contained in the claims shall not be constructed as limiting the scope.

The invention claimed is:

1. A receiver comprising a first receiving branch having associated thereto a first antenna and at least a second receiving branch having associated thereto a second antenna, the receiver comprising first means for obtaining from a first signal on the first receiving branch and a second signal on the second receiving branch, a third signal representing a first virtual antenna being at least temporarily stationary with respect to the environment when the receiver is moving with a speed, the first means being controlled by a feedback signal of the receiver, wherein the feedback signal of the receiver is utilized for timing a switching of the first virtual antenna from a first temporarily stationary virtual position to a second temporarily stationary virtual position.

2. The receiver according to claim 1, wherein the first antenna and the second antenna are spaced by a distance and arranged behind each other in a direction of motion of the receiver.

3. The receiver according to claim 1, wherein the first means comprise adaptive combiner means for linearly interpolating between the first signal and the second signal to obtain the third signal.

4. The receiver according to claim 3, wherein the first means are additionally controlled by a parameter related to the speed of the receiver.

5. The receiver according to claim 1, comprising second means or obtaining a fourth signal representing a second virtual antenna being at least temporarily stationary with respect to the environment when the receiver is moving with the speed.

6. The receiver according to claim 5, wherein the second means obtains the fourth signal from the first signal on the first receiving branch and the second signal on the second receiving branch.

7. The receiver according to claim 5, wherein the first means and the second means are controlled such that one of the first virtual antenna and the second virtual antenna is stationary with respect to the environment, at least when the other is not.

8. The diversity receiver according to claim 5, wherein one or more of the first means and the second means are fully or in part realized by hardware interacting with software or by discrete components.

9. The receiver according to claim 1, wherein the receiver is adapted to be used in one or more of the following systems: Orthogonal Frequency Division Multiplexing (OFDM) systems, Digital Audio Broadcasting (DAB) systems, Digital Video Broadband (DVB) systems, DVB-T systems, Digital Terrestrial Television Broadcasting (DTTB) systems, Code Division Multiple Access (CDMA) systems, cellular CDMA systems, Universal Mobile Telecommunications Systems (UMTS), the Global System for Mobile communications (GSM), Digital Enhanced Cordless Telecommunication (DECT) systems, wireless local area network systems, 802.11a systems, 802.11g systems, or HIPERLAN II systems.

10. The receiver according to claim 1, wherein the receiver performs a Fast Fourier Transformation and/or an Inverse Fast Fourier Transformation, and wherein the feedback signal of the receiver is at least partially obtained before the Fast Fourier Transformation and/or the Inverse Fast Fourier Transformation is performed.

11. The receiver according to claim 1, wherein the receiver performs a Fast Fourier Transformation and/or an Inverse Fast Fourier Transformation, and wherein the feedback signal of the receiver is at least partially obtained after the Fast Fourier Transformation and/or the Inverse Fast Fourier Transformation is performed.

12. A method for canceling or at least reducing signal distortions of a radio signal received by a moving receiver comprising a first receiving branch having associated thereto a first antenna and at least a second receiving branch having associated thereto a second antenna, wherein the first antenna and the second antenna are spaced by a distance and arranged behind each other in a direction of motion of the receiver, said method comprising acts of:
   obtaining a first signal on the first receiving branch and a second signal on the second receiving branch; and
   obtaining from the first signal and the second signal a third signal representing a first virtual antenna being at least temporarily stationary with respect to the environment when the receiver is moving with a speed, wherein the third signal is obtained under control of a feedback signal of the receiver, wherein the feedback signal of the receiver is utilized for timing a switching of the first virtual antenna from a first temporarily stationary virtual position to a second temporarily stationary virtual position.

13. The method according to claim 12, wherein the third signal is obtained by linearly interpolating between the first signal and the second signal.

14. The method according to claim 12, wherein a fourth signal representing a second virtual antenna is obtained from the first signal on the first receiving branch and the second signal on the second receiving branch, wherein one of the first virtual antenna and the second virtual antenna is stationary with respect to the environment, at least when the other is not.

15. The method according to claim 12, wherein a Fast Fourier Transformation and/or an Inverse Fast Fourier Transformation is performed, and wherein the feedback signal of the receiver is at least partially obtained before the Fast Fourier Transformation and/or the Inverse Fast Fourier Transformation is performed.

16. The method according to claim 12, wherein a Fast Fourier Transformation and/or an Inverse Fast Fourier Transformation is performed, and wherein the feedback signal of the receiver is at least partially obtained after the Fast Fourier Transformation and/or the Inverse Fast Fourier Transformation is performed.

17. A computer program stored on a record carrier, said computer program being adapted to carry out the method according to claim 12.

18. A receiver comprising a first receiving branch having associated thereto a first antenna and at least a second receiving branch having associated thereto a second antenna, the receiver comprising first means for obtaining from a first signal on the first receiving branch and a second signal on the second receiving branch, a third signal representing a first virtual antenna being at least temporarily stationary with respect to the environment when the receiver is moving with a speed, the first means being controlled by a feedback signal of the receiver, wherein the receiver performs at least one of a Fast Fourier Transformation and an Inverse Fast Fourier Transformation, and wherein the feedback signal of the receiver is at least partially obtained before or after the at least one of the Fast Fourier Transformation and the Inverse Fast Fourier Transformation is performed.

19. A method for canceling or at least reducing signal distortions of a radio signal received by a moving receiver comprising a first receiving branch having associated thereto a first antenna and at least a second receiving branch having associated thereto a second antenna, wherein the first antenna and the second antenna are spaced by a distance and arranged behind each other in a direction of motion of the receiver, said method comprising acts of:
   obtaining a first signal on the first receiving branch and a second signal on the second receiving branch;

obtaining from the first signal and the second signal a third signal representing a first virtual antenna being at least temporarily stationary with respect to the environment when the receiver is moving with a speed, wherein the third signal is obtained under control of a feedback signal of the receiver, wherein the at least one of a Fast Fourier Transformation; and performing at least one of a Fast Fourier Transformation and an Inverse Fast Fourier Transformation, and wherein the feedback signal of the receiver is at least partially obtained before or after the at least one of the Fast Fourier Transformation and the Inverse Fast Fourier Transformation is performed.

20. A receiver comprising a first receiving branch having associated thereto a first antenna and at least a second receiving branch having associated thereto a second antenna, the receiver comprising:

first means for obtaining from a first signal on the first receiving branch and a second signal on the second receiving branch, a third signal representing a first virtual antenna being at least temporarily stationary with respect to the environment when the receiver is moving with a speed, the first means being controlled by a feedback signal of the receiver; and second means for obtaining a fourth signal representing a second virtual antenna being at least temporarily stationary with respect to the environment when the receiver is moving with the speed.

21. The receiver according to claim 20, wherein the second means obtains the fourth signal from the first signal on the first receiving branch and the second signal on the second receiving branch.

22. The receiver according to claim 20, wherein the first means and the second means are controlled such that one of the first virtual antenna and the second virtual antenna is stationary with respect to the environment, at least when the other is not.

23. The diversity receiver according to claim 20, wherein one or more of the first means and the second means are fully or in part realized by hardware interacting with software or by discrete components.

24. A method for canceling or at least reducing signal distortions of a radio signal received by a moving receiver comprising a first receiving branch having associated thereto a first antenna and at least a second receiving branch having associated thereto a second antenna, wherein the first antenna and the second antenna are spaced by a distance and arranged behind each other in a direction of motion of the receiver, said method comprising acts of:

obtaining a first signal on the first receiving branch and a second signal on the second receiving branch;

obtaining from the first signal and the second signal a third signal representing a first virtual antenna being at least temporarily stationary with respect to the environment when the receiver is moving with a speed, wherein the third signal is obtained under control of a feedback signal of the receiver; and obtaining a fourth signal representing a second virtual antenna from the first signal on the first receiving branch and the second signal on the second receiving branch, wherein one of the first virtual antenna and the second virtual antenna is stationary with respect to the environment, at least when the other is not.

* * * * *